(12) United States Patent
Gustafsson

(10) Patent No.: US 7,753,311 B2
(45) Date of Patent: Jul. 13, 2010

(54) PROPULSION SYSTEM, AIRCRAFT COMPRISING THE PROPULSION SYSTEM AND AN OUTLET DEVICE FOR A JET ENGINE

(75) Inventor: Bernhard Gustafsson, Göteborg (SE)

(73) Assignee: Volvo Aero Corporation, Trollhattan (SE)

( * ) Notice: Subject to any disclaimer, the term of this patent is extended or adjusted under 35 U.S.C. 154(b) by 233 days.

(21) Appl. No.: 11/718,430

(22) PCT Filed: Oct. 20, 2005

(86) PCT No.: PCT/SE2005/001580

§ 371 (c)(1),
(2), (4) Date: May 2, 2007

(87) PCT Pub. No.: WO2006/049555

PCT Pub. Date: May 11, 2006

(65) Prior Publication Data

US 2007/0295860 A1 Dec. 27, 2007

(30) Foreign Application Priority Data

Nov. 5, 2004 (SE) .................................. 0402720

(51) Int. Cl.
*B64D 33/04* (2006.01)
(52) U.S. Cl. .................................. 244/53 R
(58) Field of Classification Search ............... 244/53 R, 244/52, 55, 12.5, 230, 207; 60/39.1, 230; 239/265.19, 265.11
See application file for complete search history.

(56) References Cited

U.S. PATENT DOCUMENTS

| 3,056,258 | A | * | 10/1962 | Ivor et al. | .................. 60/226.1 |
| 3,193,217 | A | * | 7/1965 | Ivor et al. | .................. 244/23 R |
| 3,631,678 | A | * | 1/1972 | Reed | ........................... 60/264 |
| 5,170,964 | A | | 12/1992 | Enderle et al. | |
| 5,271,222 | A | * | 12/1993 | Coe et al. | ..................... 60/229 |
| 5,699,662 | A | | 12/1997 | Born et al. | |

OTHER PUBLICATIONS

International Search Report from corresponding International Application PCT/SE2005/001580.
International Preliminary Report on Patentability from corresponding International Application PCT/SE2005/001580.

* cited by examiner

*Primary Examiner*—Tien Dinh
(74) *Attorney, Agent, or Firm*—WRB-IP LLP

(57) ABSTRACT

A propulsion system for a craft includes two jet engines which are arranged parallel to one another. The system further includes an inlet and/or outlet device for each jet engine. Each device includes a duct for carrying a gas, the duct having a gas inlet and a gas outlet. The gas outlet is arranged offset in relation to the gas inlet transversely to the longitudinal direction of the duct, so that the jet engine is hidden from external view.

14 Claims, 2 Drawing Sheets

PROPULSION SYSTEM, AIRCRAFT COMPRISING THE PROPULSION SYSTEM AND AN OUTLET DEVICE FOR A JET ENGINE

BACKGROUND AND SUMMARY

The present invention relates to a propulsion system for a craft, the system comprising two jet engines, which are arranged parallel to one another, and an inlet and/or outlet device for each jet engine, each device comprising a duct for carrying a gas, the duct having a gas inlet and a gas outlet. The invention further relates to an aircraft comprising the propulsion system and to an outlet device for a jet engine.

The term jet engine is intended to include various types of engines which take in air at a relatively low velocity, heat it up through combustion and expel it at a much higher velocity. The term jet engine includes turbojet engines and turbofan engines, for example.

The jet engine conventionally comprises a compressor section for compression of the intake air, a combustion chamber for combustion of the compressed air and a turbine section arranged behind the combustion chamber, the turbine section being rotationally connected to the compressor section in order to drive this by means of the energy-rich gas from the combustion chamber. The compressor section usually comprises a low-pressure compressor and a high-pressure compressor. The turbine section usually comprises a low-pressure turbine and a high-pressure turbine. The high-pressure compressor is rotationally locked to the high-pressure turbine via a first shaft and the low-pressure compressor is rotationally locked to the low-pressure turbine via a second shaft. The jet engine can be used for the propulsion of various types of jet-propelled craft including both land and waterborne craft, but the invention is primarily intended for applications in an aircraft, and in particular in an airplane engine.

Protecting an airplane against possible attack by giving the airplane a low so-called signature is already known. The term signature in this context refers to the contrast with the background. A craft should have a low signature in respect of such things as radar waves and infrared radiation. For example, hot structures and hot exhaust gases give rise to an IR signature. The scope of the invention consequently includes systems which provide passive countermeasures against infrared detection and/or radar detection.

It is desirable to provide a propulsion system for a craft, which will give the craft a reduced signature in operation.

A propulsion system for a craft, the system comprising two jet engines, which are arranged parallel to one another, and an inlet and/or outlet device for each jet engine, each device comprising a duct for carrying a gas, the duct having a gas inlet and a gas outlet, characterized in that the gas outlet is arranged offset in relation to the gas inlet transversely to the longitudinal direction of the duct, so that the jet engine is hidden from external view.

The gas duct between the gas inlet and the gas outlet therefore has a curved shape. The fact that radar waves have to bounce several times against the duct walls on their way in towards the jet engine affords a reduced signature in respect of radar detection. The surface may be provided, for example, with radar absorbing materials, thereby achieving a low radar target area.

According to a preferred embodiment of the invention the gas ducts along one section are convoluted around one another. In this way a space-efficient propulsion system is achieved. The two gas ducts accordingly cross one another viewed at right-angles to a plane in which the central axes of the jet engines extend.

The above applies both to an inlet device, that is to say a device arranged upstream of the jet engine, and to an outlet device, that is to say a device arranged downstream of the jet engine.

Where the outlet device has the aforementioned design configuration, internal hot/reflective parts of the engine are hidden from rear view. Hot parts of the jet engine, such as a rear turbine rotor are therefore visually masked from rear view. This substantially reduces the IR signature.

The invention will be described below for a propulsion system in respect of the configuration of the outlet devices for two jet engines. It will be appreciated, however, that the invention can also be implemented for a corresponding inlet configuration.

It is also desirable to provide an outlet device for a jet engine, which will give the jet engine a reduced signature.

An outlet device according to an aspect of the present invention comprises a duct for carrying a gas, the duct having a gas inlet and a gas outlet. The gas outlet is arranged offset in relation to the gas inlet transversely to the longitudinal direction of the duct, so that the gas inlet is hidden when viewed from the outlet side. When the outlet device is installed behind the jet engine, the internal hot/reflective parts of the engine will be hidden from rear view. Hot parts of the jet engine, such as a rear turbine rotor are therefore visually masked from rear view. This substantially reduces the IR signature.

Further preferred embodiments and advantages of these are set forth in the following description, in the drawings.

BRIEF DESCRIPTION OF THE DRAWINGS

The invention will be described in more detail below, with reference to the embodiment shown in the drawings attached, in which.

DETAILED DESCRIPTION

Figure 1:
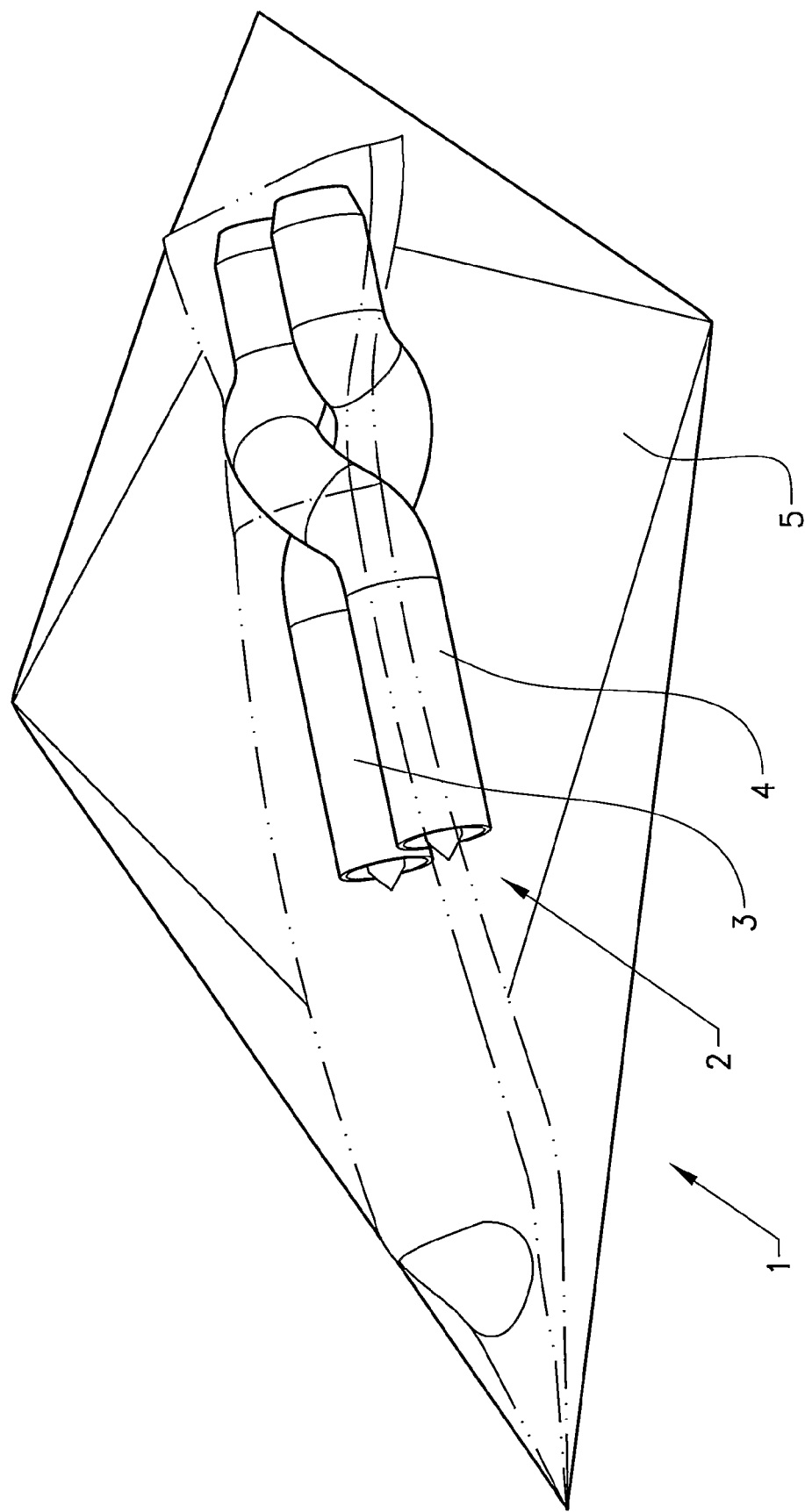
FIG. 1 shows a schematic perspective view of an airplane having a propulsion system according to the invention.

FIG. 1 shows a schematic perspective view of an airplane 1 in the form of a stealth airplane without tail fin. A propulsion system 2 comprising two jet engines 3, 4 is located centrally in the airplane fuselage. A wing 5 projects outward in both directions from the airplane fuselage laterally to the airplane.

Figure 2:
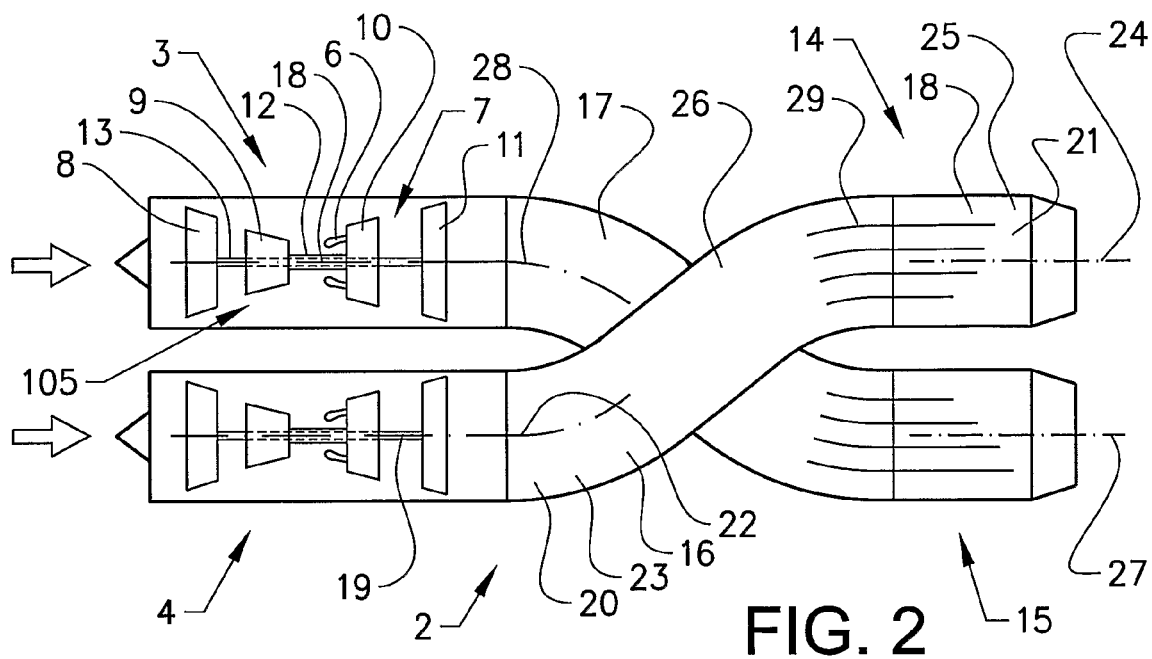
FIG. 2 shows a schematic plan view of the propulsion system according to FIG. 1.

FIG. 2 shows a schematic plan view of the propulsion system 2. The propulsion system 1 comprises two jet engines 3, 4, which are arranged parallel to one another. In other words the central axes of the jet engines are parallel to one another.

According to a first embodiment of the propulsion system the jet engines 3, 4 are identical. The constituent components of the jet engines 3, 4 are illustrated schematically in FIG. 2. Each of the jet engines 3, 4 comprises a compressor section 105 for compression of the intake air, a combustion chamber 6 for combustion of the compressed air and a turbine section 7 arranged downstream of the combustion chamber in the direction of flow, the turbine section 7 being rotationally connected to the compressor section 105 in order to drive this by means of the energy-rich gas from the combustion chamber 6.

The compressor section 105 comprises a low-pressure part 8, or fan, and a high-pressure part 9. The turbine section 7 comprises a high-pressure part 10 and a low-pressure part 11. The high-pressure compressor 9 is rotationally locked to the high-pressure turbine 10 via a first shaft 12 and the low-pressure compressor 8 is rotationally locked to the low-pressure turbine 11 via a second shaft 13. In this way a high-pressure rotor and a low-pressure rotor are formed. These are supported concentrically and rotate freely in relation to one another. The direction of gas flow in the engines is therefore from left to right in FIG. 2.

Each jet engine 3, 4 comprises an outlet device 14, 15 each of which comprises a duct 16, 17 or pipe for carrying a gas.

The two gas ducts 16, 17 extend so that they cross one another viewed at right-angles to a plane in which the central axes 18, 19 of the jet engines 3, 4 extend. The gas ducts 16, 17 are more specifically convoluted around one another, see also FIG. 3.

Only one outlet device 14 is described below. Unless otherwise specified the second outlet device 15 is of a corresponding design. The gas duct 16 has a gas inlet 20 and a gas outlet 21. The gas outlet 21 is arranged offset in relation to the gas inlet 20 transversely to the longitudinal direction of the duct 16, so that the gas inlet 20 is hidden when viewed from the outlet side. In this way hot engine parts, such as the turbine parts 10, 11, situated inside the gas inlet 20 of the outlet device 14 are hidden from view. The gas inlet 20 of the outlet device 4 is of a cross-sectional shape and size that match the shape and size of the jet engine outlet. A smooth transition is thereby formed from the jet engine to the outlet device.

A central axis 22 of a gas inlet section 23 and a central axis 24 of a gas outlet section 25 extend basically parallel. An intermediate, curved duct section 26 accordingly joins the gas inlet section 23 and the gas outlet section 25.

The two central axes 24, 27 of the gas outlet sections of the gas ducts 16, 17 furthermore extend parallel to one another and parallel to the central axes 22, 28 of the gas inlet sections.

Figure 3:
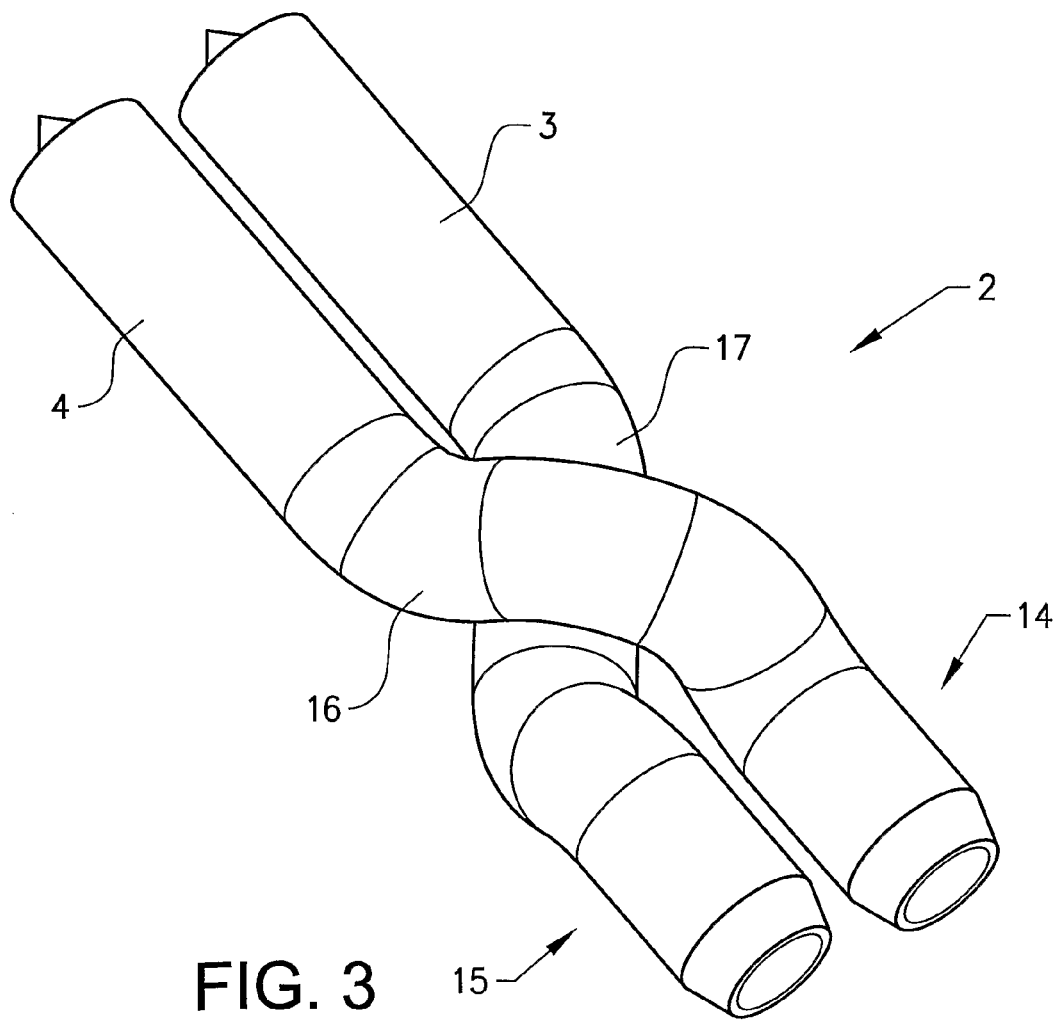
FIG. 3 shows a rear perspective view of the propulsion system according to FIG. 1.

It can be seen from FIG. 3 that at least one of the gas ducts 16, 17 is vertically offset, that is to say it extends in a plane at a distance from the plane in which the central axes 17, 18 of the jet engines 3, 4 extend. The center line of the upper gas duct 16 therefore extends at a vertical interval from the plane in which the central axes 18, 19 of the jet engines 3, 4 extend.

FIG. 2 further shows a schematic representation, bearing the reference numeral 29, of a plurality of guide vanes arranged in the gas outlet section 25 of the gas duct 16 at the transition from the curved, intermediate section 26. These can help to reduce the view of the hot parts of the engine.

As an alternative to a parallel arrangement of the center lines of the outlet sections for the two outlet devices 14, 15, it is feasible to have them extend in a divergent configuration, that is to say angled outward to the sides. It is then possible to achieve vectoring with a good "lever arm".

In the example shown above the cross-sectional shape of the outlet is circular. The scope of the invention nevertheless allows for one or both of the outlet devices to have a cross-sectional shape other than a circular shape, at least over a part of the longitudinal extent thereof. For example, over one section the outlet device may have an oblong shape, a suitably elliptical shape, or a polygonal shape.

The inner boundary surface of the outlet part furthermore preferably has such surface characteristics that the reflectivity is low, which further reduces the signature of the device.

The admission (thrust) of the engines can furthermore be individually adjusted so as to achieve a vectoring effect through so-called "propulsion control", that is to say admission adjustment or admission control.

The invention can naturally be used for types of airplane other than that shown in FIG. 1.

The jet engine 3, 4, for example, may be of the double-flow type, which means that once it has passed through the fan 8 an intake air flow is divided into two flows; an inner, compressor air flow, and an outer, fan air flow. The jet engine 3, 4 then comprises a radially inner main duct for a primary flow to the combustion chamber 6 and a radially outer duct for a secondary flow (bypass for fan flow).

The term jet engine as used above is intended to include various types of engines which take in air at a relatively low velocity, heat it up through combustion and expel it at a much higher velocity. The term jet engine includes turbojet engines and turbofan engines, for example.

The invention must not be regarded as being limited to the exemplary embodiments described above, a number of further variants and modifications being feasible without departing from the scope of the following claims.

The invention claimed is:

1. A propulsion system for a craft, the system comprising two jet engines arranged parallel to one another, each jet engine including a duct so that the two jet engines form a first and a second jet engine and duct combination for carrying a gas, the duct having a first end and a second end, wherein the first end is arranged offset in relation to the second end transversely to a longitudinal direction of the duct so that the jet engine is hidden from external view and the gas ducts are convoluted around one another along a section, and wherein a central axis of the jet engines of the first and second jet engine and duct combination is aligned with a central axis of a second end of the duct of the second and first jet engine and duct combination, respectively.

2. The propulsion system as claimed in claim 1, wherein the gas ducts extend so that they cross one another viewed at right-angles to a plane in which central axes of the jet engines extend.

3. The propulsion system as claimed in claim 1, wherein a central axis of a second section proximate the second end of the duct and a central axis of a first section proximate the first end of the duct in each of the gas ducts extend basically parallel.

4. The propulsion system as claimed in claim 3, wherein central axes of the first and second sections of the first and second ducts extend parallel to one another.

5. An aircraft comprising a propulsion system as claimed claim 1.

6. The propulsion system as claimed in claim 2, wherein a central axis of a second section proximate the second end of the duct and a central axis of a first section proximate the first end of the duct in each of the gas ducts extend basically parallel.

7. The propulsion system as claimed in claim 6, wherein central axes of the gas outlet sections of the gas ducts extend parallel to one another.

8. A propulsion system for a craft, the system comprising two jet engines arranged parallel to one another, each jet engine including an outlet duct for carrying a gas so that the two jet engines form a first and a second jet engine and duct combination, the duct having a gas inlet and a gas outlet, wherein the gas outlet is arranged offset in relation to the gas inlet transversely to a longitudinal direction of the duct so that the gas inlet is hidden when viewed from the gas outlet and the gas ducts are convoluted around one another along a section, and wherein a central axis of the jet engines of the first and second jet engine and duct combination is aligned with a central axis of a gas outlet of the duct of the second and first jet engine and duct combination, respectively.

9. The propulsion system as claimed in claim 8, wherein the gas ducts extend so that they cross one another viewed at right-angles to a plane in which central axes of the jet engines extend.

10. The propulsion system as claimed in claim 9, wherein, for each of the ducts, a central axis of a gas inlet section of the duct and a central axis of a gas outlet section of the duct extend basically parallel.

11. The propulsion system as claimed in claim 10, wherein central axes of gas outlet sections of each of the gas ducts extend parallel to one another.

12. The propulsion system as claimed in claim 8, wherein, for each of the ducts, a central axis of a gas inlet section of the duct and a central axis of a gas outlet section of the duct extend basically parallel.

13. The propulsion system as claimed in claim 12, wherein central axes of gas outlet sections of each of the gas ducts extend parallel to one another.

14. The propulsion system as claimed in claim 8, wherein central axes of gas outlet sections of each of the gas ducts extend parallel to one another.

* * * * *